United States Patent
Fannasch et al.

(10) Patent No.: US 6,986,926 B2
(45) Date of Patent: *Jan. 17, 2006

(54) METHOD FOR THE RECORDING OF DATA ON/IN DATA SUPPORTS BY MEANS OF LASER RADIATION AND DATA SUPPORTS PRODUCED THUS

(75) Inventors: Lothar Fannasch, Bielefeld (DE); Michael Hennemeyer-Schwenkner, Herbram (DE); Matthias Schumacher, Borchen (DE); Dirk Fischer, Paderborn (DE)

(73) Assignee: Orga Kartensysteme, Paderborn (DE)

( * ) Notice: Subject to any disclaimer, the term of this patent is extended or adjusted under 35 U.S.C. 154(b) by 45 days.

This patent is subject to a terminal disclaimer.

(21) Appl. No.: 10/399,956

(22) PCT Filed: Oct. 11, 2001

(86) PCT No.: PCT/EP01/11749

§ 371 (c)(1),
(2), (4) Date: Sep. 3, 2003

(87) PCT Pub. No.: WO02/35444

PCT Pub. Date: May 2, 2002

(65) Prior Publication Data

US 2005/0102464 A1 May 12, 2005

(51) Int. Cl.
*B32B 3/02* (2006.01)

(52) U.S. Cl. .................... 428/64.1; 428/64.4; 428/64.8; 430/270.11

(58) Field of Classification Search ............... 428/64.1, 428/64.4, 64.8, 913; 430/270.11, 495.1, 945; 283/85

See application file for complete search history.

(56) References Cited

U.S. PATENT DOCUMENTS

| 3,973,829 | A |   | 8/1976  | Giglia |
|-----------|---|---|---------|--------|
| 5,289,547 | A | * | 2/1994  | Ligas et al. .................... 283/72 |
| 5,820,961 | A | * | 10/1998 | Maruyama et al. ......... 428/64.1 |
| 6,096,794 | A |   | 8/2000  | Kunz et al. |
| 6,154,432 | A | * | 11/2000 | Faruqi et al. ................ 369/103 |
| 6,461,711 | B1 | * | 10/2002 | Ishida et al. ................ 428/64.1 |
| 6,475,588 | B1 | * | 11/2002 | Schottland et al. ........ 428/64.1 |
| 6,507,550 | B1 | * | 1/2003  | Usami ........................ 369/113 |
| 6,747,930 | B1 | * | 6/2004  | Weldon et al. ........... 369/53.21 |
| 6,827,283 | B2 | * | 12/2004 | Kappe et al. ................ 235/494 |

FOREIGN PATENT DOCUMENTS

| DE | 35 01 765 A | 7/1986 |
| DE | 199 07 940 A | 8/2000 |
| DE | 299 09 561 U | 10/2000 |
| GB | 1 565 243 A | 4/1980 |

* cited by examiner

*Primary Examiner*—Elizabeth Mulvaney

(74) *Attorney, Agent, or Firm*—Foley & Lardner LLP

(57) ABSTRACT

The invention relates to a method for the recording of data, in particular, personal data on and/or in a data support, by means of electromagnetic radiation. A corresponding data support is made ready, on and/or in which a dye is at least locally provided and said dye is irradiated by means of said electromagnetic radiation of at least one wavelength range, such that a change in the color of the dye by bleaching occurs in the region of the irradiation. Said color change may be determined by machine and/or by the human eye. An improved counterfeiting and manipulation security for the data support is thus achieved.

22 Claims, 2 Drawing Sheets

METHOD FOR THE RECORDING OF DATA ON/IN DATA SUPPORTS BY MEANS OF LASER RADIATION AND DATA SUPPORTS PRODUCED THUS

The invention relates to a method for the recording of data, in particular personalization data, on and/or in a data support by means of laser radiation and further relates to data supports produced by means of this method, in particular plastic cards.

The prior art is the introduction of markings such as images into the surface of plastic cards in the form of gray-stage images, based on a carbonization process, which is initiated by laser beams of a specific wavelength (as a rule 1064 nm).

According to the prior art, it is therefore possible to produce black markings with laser labeling systems. This is applied in laser personalization, which is used as an economic method of high quality in many sectors and often also represents a security feature.

On the basis of the abovementioned prior art, a method is to be developed with which recording of data in/on any desired data support by means of electromagnetic radiation, in particular by means of laser, is carried out simply, cost-effectively and reliably, and therefore increased security against forgery is achieved. In addition, a corresponding data support is to be proposed.

In order to achieve this set object, use is made of the technical teachings of the independent claims.

A significant feature here is that any desired data support is provided, on and/in which at least one colorant is provided at least locally, and this colorant is irradiated by means of an electromagnetic radiation source of at least one long wave range, so that, in the region of the irradiation, a change in the color of the colorant results from bleaching, it being possible for this color change to be detected by machine and/or by a human eye.

In particular, this method is used for producing personalized plastic cards as data supports, which plastic cards contain a colorant formulation which permits colored laser marking of the card by means of wavelength-selective bleaching.

It is advantageous in this case that, for the first time, recording of data in/on a data support in the form of a colored laser labeling or decoration is now possible, the marking (data) to be achieved being carried out without destruction of the material of the data support, in particular its surface, and thus being secure against subsequent manipulation. This colored marking can be used in particular, as already mentioned, for the personalization of plastic cards.

The invention therefore uses a laser system which, at at least one, but preferably at a number of wavelengths, operates in the visible or invisible spectrum, for the formation of colored markings by means of selective bleaching of a colorant formulation.

The various interactions between laser light and material include the bleaching of chromophoric substances. In this case, according to the invention, there is the possibility, with the aid of a laser beam, of destroying these chromophoric substances, so that the body color of a substrate, for example containing pigments, changes from colored to white.

This process is used in the context of the present invention.

The basic precondition for this process is that the chromophoric substance absorbs the laser light and enters into a chemical reaction in which it changes its color characteristics. In the simplest case, chemical decomposition of the chromophoric substance takes place. In addition, the laser light is intended not to excite secondary reactions which lead to discoloration of the substrate, and therefore do not effect any bleaching to white.

The colorant formulation used exhibits a color change because of the selective bleaching, this color change corresponding to a lightening and/or a change in the hue and the color saturation, depending on the type and number of different colorants.

This colorant formulation comprises, inter alia, one or more different types of pigment(s) or a pigment mixture of various types of pigments, one or more various types of dye(s) or a mixture of dyes.

According to the definition of colorants (DIN 55943-11-1993: Colorants, terms), pigments are insoluble colorants as opposed to soluble colorants, which are generally designated dyes.

If a plurality of colorants is provided, then their composition is selected such that individual colorants can be bleached by laser light in a wavelength-selective manner. The selectivity is in this case provided in that, at a selected laser wavelength, primarily only one species of colorant absorbs laser light and is bleached as a result. The range of laser wavelengths advantageously coincides approximately with the region around the absorption maximum of the colorant. It is therefore preferred if the colorant formulation used is matched in terms of the absorption behavior of the individual colorants to the wavelengths of the laser light used, that is to say the wavelength of the laser light used corresponds to the absorption maximum.

In the case in which a single colorant is used, a light or white marking can be obtained as a result of the bleaching.

If color mixtures are used, then by means of the selective bleaching of one or else a plurality of colorants, a displacement of the hue of the colorant mixture is achieved in accordance with the laws of "subtractive color mixing", which preferably extends from neutral (gray stages or black) to colored and ultimately—in the case of bleaching all the colorants provided on/in the data support—to neutral (white) again. In this case, the level of bleaching of individual colorants can be modulated by the intensity of the laser light. The number of achievable colors is in this case determined by the composition of the colorant selection and the adaptation of the absorption spectra that follows from this.

The number of colorants comprised by the formulation is unimportant to the principle of selective bleaching. With an increasing number of colorants, more individual colors can be achieved. However, more complex laser systems and special colorants are required as a result, which leads to increased production costs of the data support provided with data.

Possible colorants are the various classes of substances which are also used in the varnish, printing ink industry or plastic coloring. For example, azo, quinacridone, phthalocyanin, triarylcarbonium or metal complex dyes and others.

In the following text, the data support, which is intrinsically any desired data support, will be described only as a multilayer plastic card in a check card format, but this is not intended to restrict the invention to this extent, since in principle any desired shapes and materials of the data support according to the invention can be provided.

Likewise, all possible incorporations and installation locations of the colorant in a data support are claimed. The colorants can therefore be printed as printing ink onto a specific layer or else a plurality of layers of the data support or applied in another way. However, the colorants can also be incorporated into the plastic polymer of one or more layers of the data support. The colorants can also be incorporated into the adhesive, the varnish or as an additive in the plastic material.

In order to implement the colorant formulation into the card, different ways are possible.

1. The colorant formulation is worked into the polymer matrix of the card material. The colored polymers obtained in this way are then
   a) either processed to form films which, for example, are integrated as covering films or as core films into the layer structure of laminated cards,
   b) or polymers containing the colorant formulation are processed in the injection molding process. In this case, the entire card body or, with the aid of the multicomponent injection molding technique, part of the card body is then injection molded from the polymer containing the colorant formulation.
2. The colorant formulation is worked into a coating system. This coating system can be both a varnish or else an adhesion promoter containing the colorant formulation or an adhesive system. Using this coating system, the surfaces of the card can be coated, in that
   a) in the case of laminated cards, coating of specific films is carried out via known processes such as screen printing, flexographic printing, offset printing, pad printing or roll application and/or coating by a spraying method and this coating is placed as a result of the integration of the coated films in the layer structure of the card or
   b) analogous to a), coating of injection molded cards is carried out.
3. Furthermore, the colorant formulation can be implemented over the entire area or else part of the area via the use of:
   a) embossing film, that is a coated film which transfers its coating to the card or to individual films of the cards to be laminated via an embossing process,
   b) "label", that is to say a prefabricated flat label which is laid in the foil composite to be laminated and laminated in,
   c) "in-mold film decoration", which permits the coating of the surface in the injection mold.

In general, there is the possibility of coating the surface of the card or to cover the layer containing the colorant formulation by a protective layer (protective varnish or "overlay film").

The colorant formulation is therefore preferably worked into the polymer matrix of the card material, and the colored polymers obtained in this way are either processed to form films, which are integrated into the layer structure of laminated cards as cover films or as core films, or the colored polymers obtained in this way are processed to form cards in the injection molding process. In the process, the entire card body or, with the aid of the multicomponent injection molding technique, a part of the card body can be injection molded from the polymer containing the colorant formulation.

The colorant formation can also be applied to the surface of the card in the form of a coating or, in the case of laminated cards, applied to one of the films to be laminated. This coating system is either a varnish or an adhesion promoter containing the colorant formation. Using this coating system, the cards or the films can be coated over the entire surface or else part of the surface via known processes such as screen printing, flexographic printing, offset printing, gravure printing, pad printing and roll application.

It is preferable for the colorant formulation to be implemented over the entire surface but also over part of the surface, in particular via the use of:
   a) embossing film, that is a coating film which transfers its coating to the card or to individual films of the cards to be laminated via an embossing process,
   b) "label", that is to say a prefabricated flat label which is laid in the foil composite to be laminated and laminated in,
   c) "in-mold film decoration", which permits the coating of the surface in the injection mold.

The invention is the precondition for a colored marking, over part of the surface or else the entire surface, of a plastic card with the laser. It thus permits colored laser personalization of cards.

In the following text, the invention will be explained in more detail by using a number of drawings, which represent the embodiments. In this case, further features and advantages of the invention emerge from the drawings and their description.

FIG. 1 shows the data support 1 according to the invention in a first embodiment with two core films 5 laminated one over the other as carrier material.

Applied to the upper core film 5 is a first printed layer 3, on which in turn there lies a first transparent covering film 4 with colorants. This first transparent covering film 4 with colorants is coated with a second printed layer 3, which is covered with a second transparent covering film 4 with colorants, on which in turn an embossing film 2 is applied. The embossing film 2 is provided with colorants on its side facing the second covering film 4, which colorants are embossed onto the surface of the second covering film by the embossing process of the embossing film 2.

Figures 1, 2:
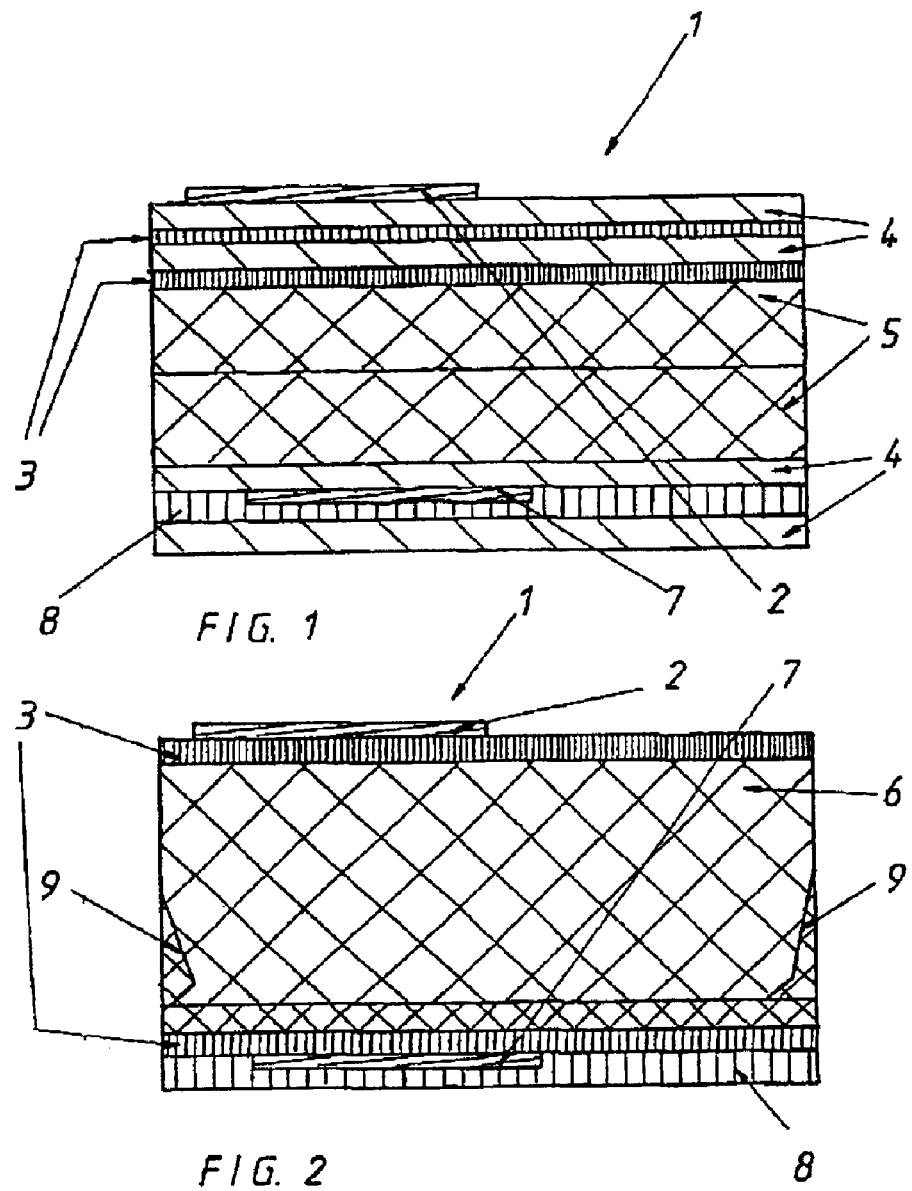
FIG. 1 shows the data support of the invention in a first embodiment with core film as carrier material.
FIG. 2 shows the data support according to the invention in a second embodiment with injection molded body as carrier material.

Applied to the lower core film 5 is likewise a covering film 4 with colorants, on which a label 7 is laid locally, which label 7 is secured by means of a whole-area coating 8. The coating 8 completely encloses the label. Colorants may also be present in the coating 8 itself. In FIG. 1, a further covering film 4 with colorants is applied to the coating 8.

With the embodiment of FIG. 1, for example personalization of an identity card in a plurality of layers can be carried out three-dimensionally, so to speak, which leads to increased security against manipulation and forgery.

FIG. 2 shows the data support 1 according to the invention in a second embodiment with injection molded body 6 as carrier material. The injection molded body 6 itself can contain colorants, exclusively or in addition to other parts of the data support 1.

In this example, the supporting injection molded body 6 comprises two parts, namely a first upper and a second lower injection molded body 6, which are connected to each other via their respective surfaces. This connection can be produced by means of an adhesive layer, lamination or in the injection molding process itself. In order to obtain more favorable cohesion of the two injection molded bodies 6 lying above one another, these are connected to each other by means of bevels 9, at least to some extent also in their transverse direction. The bevel 9 runs obliquely with respect to the longitudinal axis of the data support 1, so that the two injection molded bodies 6 merge harmoniously into each other in the thickness direction in the edge region. In the edge region of the data support, the two injection molded bodies 6 are preferably approximately equally thick, which leads to favorable cohesion.

Applied to the upper injection molded body 6 is an upper printed layer 3, on which there is an embossing film 2 locally. This embossing film 2 has the characteristics as already described in FIG. 1.

Applied to the surface of the lower injection molded body 6 is a lower printed layer 3, on which a label 7 is placed locally and is secured there by means of a whole-area coating 8.

In FIGS. 1 and 2, therefore, colorants in the form of soluble dyes and and/or insoluble colored pigments can be provided in all parts of the data support 1, but in particular in the films 2, 4, 5, 6 and the injection molded body 6.

The embodiments of FIGS. 1 and 2 are of course only exemplary and are not intended to restrict the invention thereto. In other embodiments, other layer structures of the data support 1 are provided. What is important here is only the presence of, in particular, colorants that can be bleached by means of laser radiation in at least one local region of the data support for the forgery-proof recording of (personalization) data.

Figure 3:
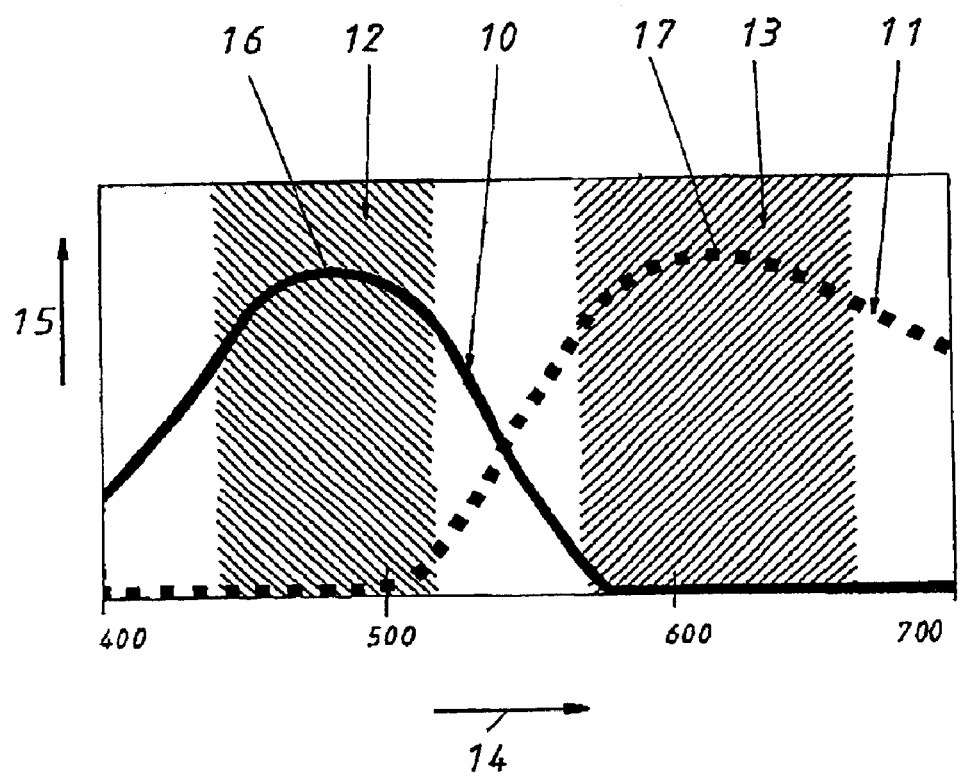
FIG. 3 shows the wavelength spectrum of the colorant and the associated laser radiations for a system having two basic colors in/on the data support according to the invention.

FIG. 3 reproduces an example of a system having two basic colors of pigments. In addition to the possible absorption curves 10, 11 of the colorants, the preferred ranges 12, 13 for the wavelength of the lasers are specified here. The absorption 15 of two different types of colorant is therefore specified over the course of the wavelength 14 in nm.

It can be seen easily here that the maximum 16 of the absorption 15 for the first pigment (spectrum 10) falls into the first wavelength range 12 of the laser, and the maximum 17 of the absorption 15 for the second pigment (spectrum 11) into the second wavelength range 13 of the laser.

What is claimed is:

1. A method for the recording of data, in particular personalization data, on and/or in a data support by means of electromagnetic radiation, characterized in that any desired data support is provided, on and/or in which at least one colorant is provided at least locally, and this colorant is irradiated by means of the electromagnetic radiation from at least one long wave range, so that, in the region of the irradiation, an irreversible change in the color of the colorant results from bleaching, this irreversible color change being detectable by machine and/or by a human eye.

2. The method as claimed in claim 1, characterized in that the electromagnetic radiation is introduced by means of a laser.

3. The method as claimed in either of claim 1 or 2, characterized in that the electromagnetic radiation source can be modulated, at least in the intensity and/or in the emitted wavelength of the radiation.

4. The method as claimed in claim 1, characterized in that a dye that is soluble in the carrier substance of the data support and/or insoluble colored pigments is/are used as a colorant.

5. The method as claimed in claim 1, characterized in that a colorant formulation is used which contains a plurality of different colorants.

6. The method as claimed in claim 1, characterized in that the colorant formulation used is matched in terms of the absorption behavior of the individual colorants to the wavelengths of the electromagnetic radiation used.

7. The method as claimed in claim 1, characterized in that a range of the electromagnetic radiation wavelength used lies approximately in the region of the absorption maximum of at least one colorant.

8. The method as claimed in claim 1, characterized in that the color change corresponds to a lightening and/or a change in the hue and/or the color saturation, depending on the type and number of different colorants.

9. A data support which has been provided with data in accordance with the method of claim 1, characterized in that the data support (1) comprises plastic.

10. The data support as claimed in claim 9, characterized in that the colorant formulation is worked, entirely or partially, into a polymer matrix of a material of the data support.

11. The data support as claimed in either of claim 9 or 10, characterized in that the data support has approximately the dimensions of conventional credit cards or identity cards or passports.

12. The data support as claimed in claim 9, characterized in that the data support is a multi-layer structure.

13. The data support as claimed in claim 12, characterized in that the data support contains at least one film which is integrated as a covering a film or as a core film into the multi-layer structure of the laminated data support.

14. The data support as claimed in claim 9, characterized in that the data support comprises at least one injection molded body, which is produced in an injection molding process or in a multicomponent injection molding process.

15. The data support as claimed in claim 9, characterized in that the colorant formulation is provided in/on films provided to the data support.

16. The data support as claimed in claim 14, characterized in that the colorant formulation is provided in/on the injection molded body of the data support.

17. The data support as claimed in claim 14, characterized in that the colorant formulation is applied in the form of a coating to the surface of the at least one film or the at least one injection molded body of the data support.

18. The data support as claimed in claim 17, characterized in that the coating contains at least one varnish and/or adhesion promoter and/or adhesive system.

19. The data support as claimed in claim 17, characterized in that the coating is provided over the whole area or part of the area and is applied by screen printing and/or flexographic printing and/or offset printing and/or gravure printing and/or pad printing and/or a roll application process and/or a spraying process.

20. The data support as claimed in claim 14, characterized in that the colorant formulation is provided on an embossing film and is applied by an embossing process to the surface of the at least one laminated film or of the at least one injection molded body of the data support.

21. The data support as claimed in claim 12, characterized in that the colorant formulation is present in a label.

22. The data support as claimed in claim 21, characterized in that the label is introduced within layers of the multi-layer structure.

* * * * *